(12) United States Patent
Dropps et al.

(10) Patent No.: US 7,933,716 B2
(45) Date of Patent: Apr. 26, 2011

(54) AZIMUTHAL EQUIDISTANT PROJECTION NAVIGATION DISPLAY AND METHOD

(75) Inventors: Timothy C. Dropps, Albuquerque, NM (US); John Meeker, Rio Rancho, NM (US); Mark Roff, Albuquerque, NM (US); Edward W. Ronish, Laurel, MD (US)

(73) Assignee: Honeywell International Inc., Morristown, NJ (US)

( * ) Notice: Subject to any disclaimer, the term of this patent is extended or adjusted under 35 U.S.C. 154(b) by 1001 days.

(21) Appl. No.: 11/754,790

(22) Filed: May 29, 2007

(65) Prior Publication Data
US 2010/0017123 A1   Jan. 21, 2010

(51) Int. Cl.
*G01S 5/00* (2006.01)
(52) U.S. Cl. ................................. 701/212; 340/961
(58) Field of Classification Search .................. 701/212, 701/4–9, 120; 73/178 R, 178 T; 340/961, 340/963, 970, 977; 342/65; 244/180, 181
See application file for complete search history.

(56) References Cited

U.S. PATENT DOCUMENTS

| 5,341,463 | A | 8/1994 | Wescott et al. |
| 7,756,637 | B2* | 7/2010 | Wipplinger et al. .......... 701/211 |
| 7,796,055 | B2* | 9/2010 | Clark et al. .................... 340/972 |

* cited by examiner

*Primary Examiner* — Dalena Tran
(74) *Attorney, Agent, or Firm* — Ingrassia Fisher & Lorenz, PC (57) ABSTRACT

Methods and apparatus are provided for an azimuthal equidistant projection (AEP) aircraft navigational display. The apparatus comprises a generator providing the aircraft's current latitude and longitude ($\phi_1, \lambda_0$), a user input for providing the desired map radius R, a display for presenting the navigational information, a map data source providing topographical information associated with geo-spatial coordinates, and a controller and memory coupled to the generator, data source, input and display for providing data transformations. Map data containing topographical information associated with each geo-spatial coordinate is obtained from the map data source for an area of approximately radius R from ($\phi_1, \lambda_0$). Using the controller and memory, the geo-spatial coordinates are converted to AEP spatial coordinates so that the topographical information is now associated with such AEP spatial coordinates. The transformed map data is sent to the display to provide AEP navigational information on the display around ($\phi_1, \lambda_0$).

20 Claims, 6 Drawing Sheets

AZIMUTHAL EQUIDISTANT PROJECTION NAVIGATION DISPLAY AND METHOD

FIELD OF THE INVENTION

The present invention generally relates to navigation displays and more particularly relates to aircraft navigation displays providing current aircraft location relative to features on a map of the surrounding area.

BACKGROUND OF THE INVENTION

It is common today to provide navigational map displays of the landscape or seascape over which a vehicle is passing, with the vehicle's current position indicated thereon. These displays are almost always flat, which requires that the curved surface of the earth be presented in two dimensions rather than its actual three dimensions. The curvature of the earth is not ignored, rather the curved surface of the earth is projected onto a two-dimensional plane and that projection is what is presented on the display.

Figure 1:
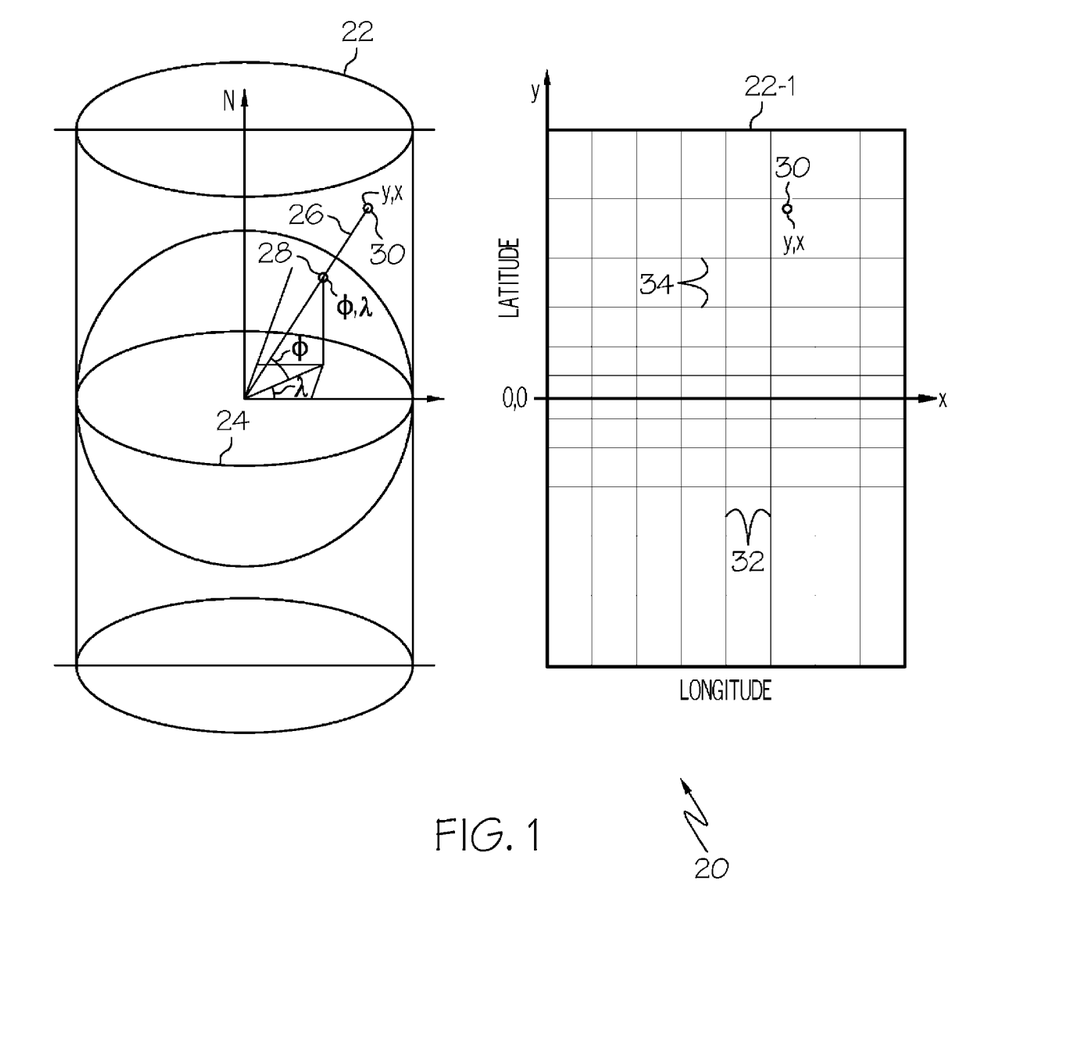
FIG. 1 illustrates graphically a method of making a two dimensional an equidistant cylindrical projection (ECP) of a spherical surface (e.g., the three dimensional earth's surface) and the distortion inherent in such a projection.

FIG. 1 illustrates graphically method 20 of generating two dimensional equidistant cylindrical map projection (ECP) 22 of a spherical surface (e.g., the three dimensional earth's surface) 24 and the distortion inherent in such a projection. Consider spherical surface 24 located within tangential cylindrical surface 22. Vector 26 makes latitude angle $\Phi$ and longitude angle $\lambda$ with respect to the axes of spherical surface 24. Vector 26 intersects spherical surface 24 at location 28 ($\Phi,\lambda$) and surrounding cylindrical surface 22 at location 30 ($y,x$). Cylindrical surface 22 is unwrapped and flattened as shown by two dimensional surface 22-1 at the right of FIG. 1. Horizontal lines 34 on cylindrical surface 22-1 correspond to latitude lines on spherical surface 24 and vertical lines 32 on cylindrical surface 22-1 correspond to longitude lines on spherical surface 24. There is a one-to-one correspondence between ($\Phi,\lambda$) on spherical surface 24 and ($y,x$) on cylindrical surface 22 and 22-1. Assuming that the center of projection is the equator and any one meridian along the equator, a consequence of this cylindrical projection is that the cylindrical map display is stretched toward the poles ($\Phi=\pm\pi/2$). However, there is no distortion along any meridian and the equator is the only parallel that does not have any distortion. The distortion along any parallel is given by $k=\cosine(\Phi_1)/\cosine(\Phi)$, where $\Phi_1$ is the latitude of the center of projection. Stated another way, the map scale varies with position on the map display so that the magnitude of these distortions change depending upon the distance of observation from the center of projection. For example, two mountain peaks will appear to have a first separation when located a first distance from an observer and a different separation when located at a second distance from the observer assuming that the center of projection has changed along with the observer. This relative location error can make safe and precise navigation more difficult.

In a navigational display, the current position of a vehicle or observer in the vehicle is plotted on a two-dimensional map display and updated as the vehicle moves. The map may remain fixed while the vehicle position appears to move across the fixed map display or the vehicle position can remain fixed on the display and the map appears to move under the vehicle. Either arrangement is common. While the above noted distortion problem associated with flat navigational displays applies to any type of moving vehicle (e.g., car, ship, plane, etc.) or observer therein, they are more apparent with aircraft because of the aircraft's relatively high speed. The larger the distance that the aircraft travels over the surface of the earth per unit time, the less time the pilot has to take into account the inherent distortions of the map display and select a safe flight path. Accordingly, it is desirable to provide an aircraft map display on which the aircraft position relative to map features is presented in such a way that the directions and relative distances between the aircraft and any map features are accurately presented. In addition, it is desirable that these directions and distances be independent of the aircraft location relative to a particular feature on the map display. Thus, the pilot or navigator can evaluate at a glance the direction and relative distance between his or her aircraft and a potential navigation hazard without concern for map distortions inherent in the two-dimensional presentation of the curved surface of the earth. In addition, it is desirable that the display of the local area map and aircraft position be automatically updated in a manner that preserves this intuitive direction and distance visualization accuracy. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for an azimuthal equidistant projection (AEP) aircraft navigational display. The apparatus comprises a generator providing the aircraft's current location (e.g., current latitude and longitude $\phi_1,\lambda_0$), a map data source providing topographical information associated with geo-spatial coordinates ($\Phi,\lambda$), a user input for providing the desired map radius R relative to the center of projection, which is typically ($\phi_1,\lambda_0$) for the purposes of this invention, a controller and memory for processing data transformations, and a display for presenting the navigational information. Map data containing topographical information associated with each geo-spatial coordinate is obtained from the map data source for an area of approximately radius R surrounding ($\Phi_1,\lambda_0$). Using the controller and memory, the geo-spatial coordinates and by extension, the topographical information contained in the map data is projected to $(y,x)_{AEP}$ spatial coordinates. The transformed map data is sent to the display to provide AEP format navigational information on the display around ($\phi_1,\lambda_0$).

A method is provided for an AEP aircraft navigational display. The method comprises reading a map data source file to obtain geo-referenced topographical information, obtaining the aircraft's current location ($\phi_1,\lambda_0$), and the user desired map radius R. The geo-spatial coordinate data are then converted to an AEP format so that the topographical data is now associated with $(y,x)_{AEP}$ spatial coordinates. The transformed map data is then sent to the display to provide AEP format navigational information on the display around ($\phi_1,\lambda_0$).

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 2:
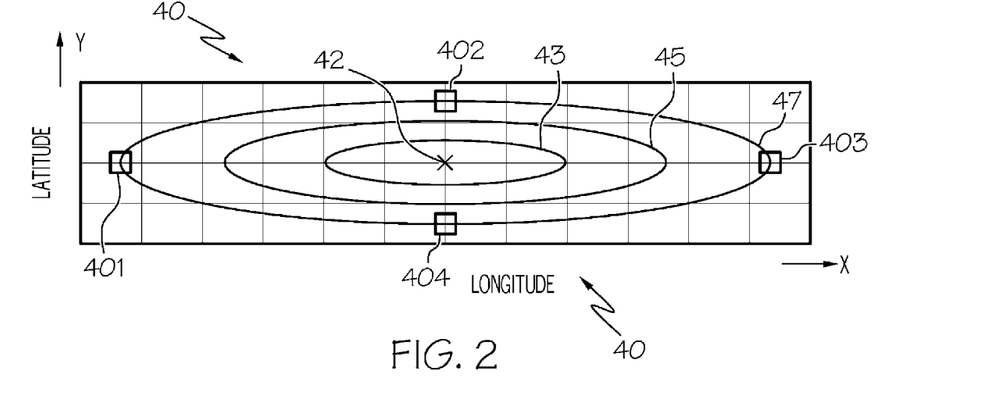
FIG. 2 illustrates graphically a region of interest on two-dimensional ECP map data such as that shown in FIG. 1 for a particular region of earth.
Figure 3:
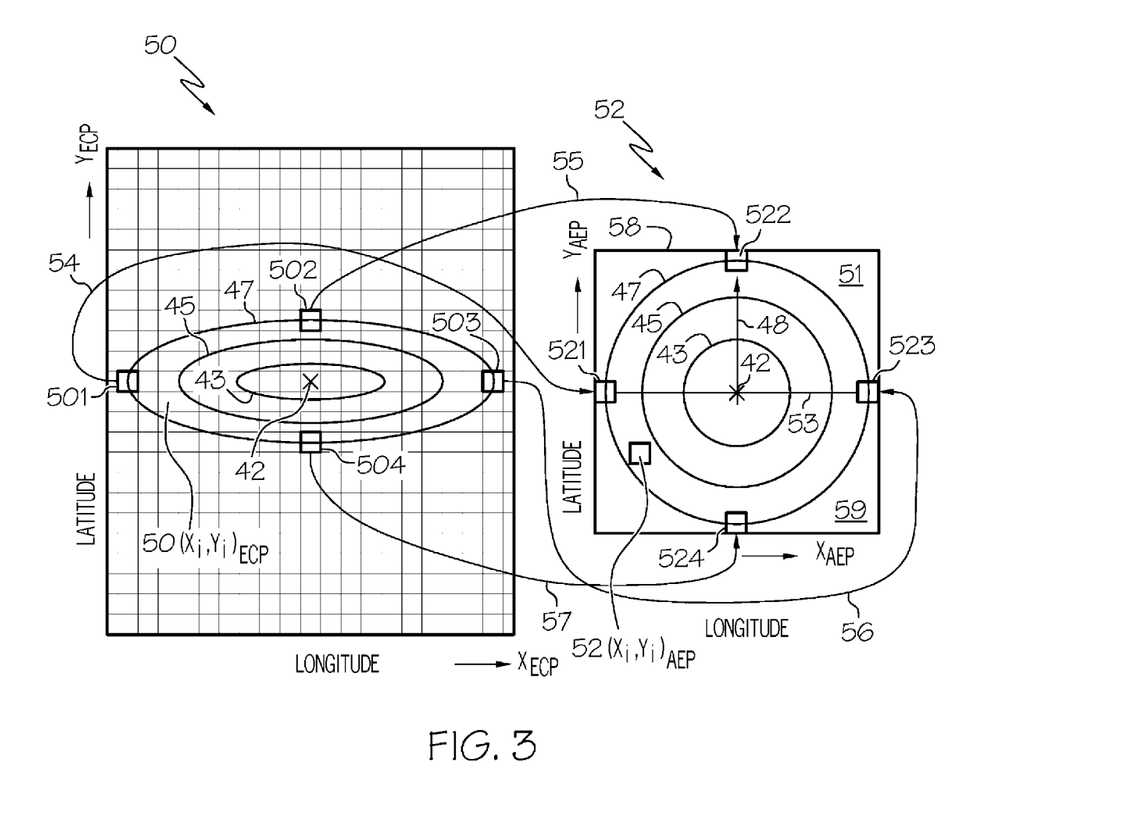
FIG. 3 shows a graphical method illustrating how two-dimensional map data available, for example as an ECP such as is illustrated in FIG. 2, is converted to an azimuthal equidistant projection (AEP) map display, according to the present invention.

FIG. 2 illustrates graphically a region of interest of two-dimensional ECP map data 40 such as that shown in FIG. 1 for a particular region of earth. It is assumed for purposes of explanation that an aircraft is located at position 42 and that contours 43, 45 and 47 represent different radii from the aircraft as measured on the surface of the earth. Contours 43, 45 and 47 need not be regular or concentric as viewed from ECP map data 40. They are completely dependent on the underlying source ECP map data 40 and are defined simply by each $(\Phi,\lambda)$ coordinate along their curves. FIG. 3 shows graphical method 49 illustrating how texture data 50 available, for example as ECP 40, is converted to AEP map data 52 on display 58, according to the present invention. Two dimensional texture data 50 represents the topographical features stored in map data 40. Texture data 50 is generated by processing the topographical features stored in the two-dimensional cylindrical map data 40 into a color image suitable for display. There is a one-to-one correspondence between the projection inherent in the source map data 40 and the texture data 50. For simplicity of explanation, texture data 50 is assumed to be in the form of an ECP, which is a common form available in map data bases, but this is not essential. Any map data base format may be used. A local topographic feature representation is stored in each cell $50(y,x)_{ECP}$ within texture data 50. The subscript "ECP" is used to indicate that this refers to the assumed equidistant cylindrical projection of texture data 50, but is intended to include whatever projection may have been used to generate texture data 50. The topographic feature stored in cell $50(y,x)_{ECP}$ or group of cells may be a particular color or set of colors indicative, for example, of the height of the local terrain at location $50(y,x)_{ECP}$, a road, airport, landmark, tower, city, etc. or other pattern readily interpretable by the user. Central location 42 corresponds to the current aircraft position $(\phi_1,\lambda_0)$ mapped to $(y_1,x_0)_{ECP}$ of texture data 50. Contour 47 is assumed to represent the maximum range R from current aircraft position 42 that is of interest to the user, with intermediate contours indicated at 45, 43. If texture data 50 were presented to the user in its raw form, the difficulty for the user to judge at a glance the distance to topographic features located in different parts of the display because of the location dependent map scaling is apparent.

This difficulty is overcome by converting spatial (y,x) coordinates $50(y,x)_{ECP}$ of texture data 50 to AEP map data 52 on display 58 shown at the right of FIG. 3, that is, each spatial coordinate $50(y_i,x_i)_{ECP}$ of texture data 50 is converted to the corresponding spatial coordinate $52(y_i,x_i)_{AEP}$ of AEP map data 52 shown on display 58. For example, the topographical information stored in cell 501 corresponding to spatial coordinates $(y_1,x_1)_{ECP}$ of data 50 is presented in cell 521 at spatial coordinates $(y_1,x_1)_{AEP}$ of data 52, as shown by path 54 leading to display 58. Analogously, the topographical information stored in cell 502 at spatial coordinates $(y_2,x_2)_{ECP}$ is presented in cell 522 at spatial coordinates $(y_2,x_2)_{AEP}$ of data base 52 as shown by path 55 leading to display 58, topographical information stored in cell 503 at spatial coordinates $(y_3,x_3)_{ECP}$ is presented in cell 523 at spatial coordinates $(y_3,x_3)_{AEP}$ of data base 52 as shown by path 56, and topographical information stored in cell 504 at spatial coordinates $(y_4,x_4)_{ECP}$ is presented in cell 524 at spatial coordinates $(y_4,x_4)_{AEP}$ of data base 52 as shown by path 57 leading to display 58. This example is non-limiting and it is understood that this procedure continues until every texture data point $50(y_i,x_i)_{ECP}$ of ECP texture data 50 is mapped to texture data point $52(y_i,x_i)_{AEP}$ of AEP texture data 52 on display 58. That is, there are many more contours of interest that are mapped. In practice, just a few points along a few chosen contours are selected such that a linear interpolation between the points then mapped between texture data 50 and AEP texture data 52 does not induce an appreciable error in the AEP. When the information in data 52 is presented on display 58 with aircraft location 42 at the center of the display, then range contours 43, 45 and 47 have the form of concentric circles and the location of any topographic feature or geographic point is shown at its correct distance and relative angle from aircraft location 42 on map display 58. Stated another way, the topographic map presented on display 58 based on AEP topographic map data 52 correctly displays the distance from central location 42 to any topographic feature independent of the distance or relative angle from central location 42. This is much more useful to the pilot because it presents the navigational data (e.g., distance and direction to any topographic feature) in a way that can be interpreted at a glance without any need to mentally adjust for the different map scales in different parts of the display. This is a significant improvement over prior art aircraft navigation displays which lack this feature.

While display 58 of FIG. 3 shows AEP presentation 52 arranged symmetrically around current aircraft position 42, this is merely for convenience of explanation and not intended to be limiting. Persons of skill in the art will understand based on the teachings herein, that display center (e.g., current aircraft position $(\phi_1,\lambda_0)$) 42 may be placed anywhere on display 58. For example, suppose the aircraft is moving as shown by direction vector 48, then portion 51 of AEP topographic map information 52 that lies ahead of line 53 perpendicular to direction vector 48 and passing through current aircraft position $(\phi_1,\lambda_0)$ 42 may be of much greater interest than portion 59 of topographic map information 52 that lies behind line 53. In this case it may be desirable to relocate AEP information 52 on display 58 so that current aircraft location $(\phi_1,\lambda_0)$ 42 is placed near the bottom edge of display 58. In this situation, effectively only upper half portion 51 of AEP information 52 would be shown on display 58 and lower half portion 59 would be suppressed or not determined. When lower half portion 59 is not being presented, there is no need to retrieve and/or transform or convert the corresponding spatial coordinates and topological information on which lower half 59 would be based. Thus, in a further embodiment of the invention, only those portions of the spatial coordinates and associated topological information that are intended to be displayed are retrieved from the map data base and converted from the stored map coordinates to the desired AEP coordinate format. This simplifies the computational task of refreshing the navigational display. Thus, it is desirable that the location of current aircraft position ($\phi_1, \lambda_0$) 42 on display 58 be user selectable to fit the particular flight circumstances. While such capability is useful, it is not essential.

Figure 4:
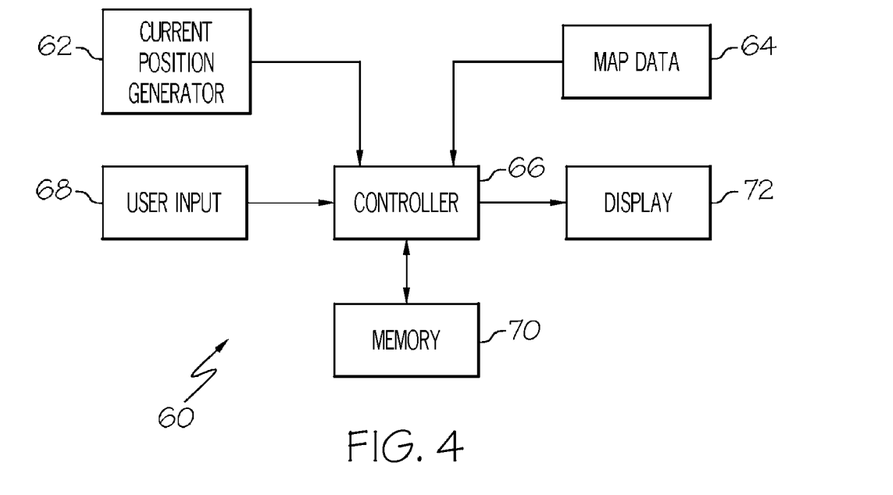
FIG. 4 is a simplified schematic diagram of an electronic system adapted to provide an AEP navigation display, according to the present invention.

FIG. 4 shows a simplified schematic diagram of electronic system 60 adapted to provide an AEP map for an aircraft navigation display, according to the present invention. Electronic system 60 comprises current position generator 62 which provides the current aircraft position ($\phi_1, \lambda_0$), where the subscripts "0" and "1" are used to indicate the current position that will become the center of symmetry of the navigation display. Non-limiting examples of position generators are inertial navigation systems, GPS based navigation systems and so forth. Any geo-referenced current position source may be used. System 60 also comprises map data source 64, controller 66, user input 68, memory 70 and display 72, which are coupled as indicated in FIG. 4 or, according to a further embodiment, by means of a data bus. Either arrangement is useful. Map data source 64 may be any convenient form of substantial memory in which map data is stored in a digital format. Memory 70 may be partially static memory in which the software for operating system 60 is stored and dynamic memory used in executing the software and temporarily storing useful data. Map data source 64 may be combined with memory 70. User input 68 allows the user to specify various display parameters, for example and not intended to be limiting, display brightness and contrast, range R desired to be displayed, desired proximity warnings, and other user selectable parameters (e.g., the position of the aircraft location on the display). Display 72 is any form of display on which graphic map information may be usefully presented, primarily in visual form. Non-limiting examples are Cathode Ray Tube (CRT) displays, flat panel displays, projection displays, and so forth. Controller 66 receives the user selections or requests (e.g., desired range R, desired display location of current aircraft position, etc.) from user input 68 and the current aircraft position ($\phi_1, \lambda_0$) from current position generator 62, and based on these inputs retrieves the appropriate portion of the map data stored in map data source 64 needed to generate the desired navigational display. For example, if map information falling within range R around ($\phi_1, \lambda_0$) is desired, then the topographical map data within contour 47 of FIGS. 2-3 are loaded into memory 70 along with their corresponding spatial coordinates. Controller 66 operating under the instructions of the navigational software stored in memory 70 then performs the spatial coordinate transformation illustrated graphically in FIG. 3 to obtain the AEP data 52 of FIG. 3 which it sends to display 72 in the format appropriate for display 72, so as to provide AEP display 58 of FIG. 3.

Figure 5:
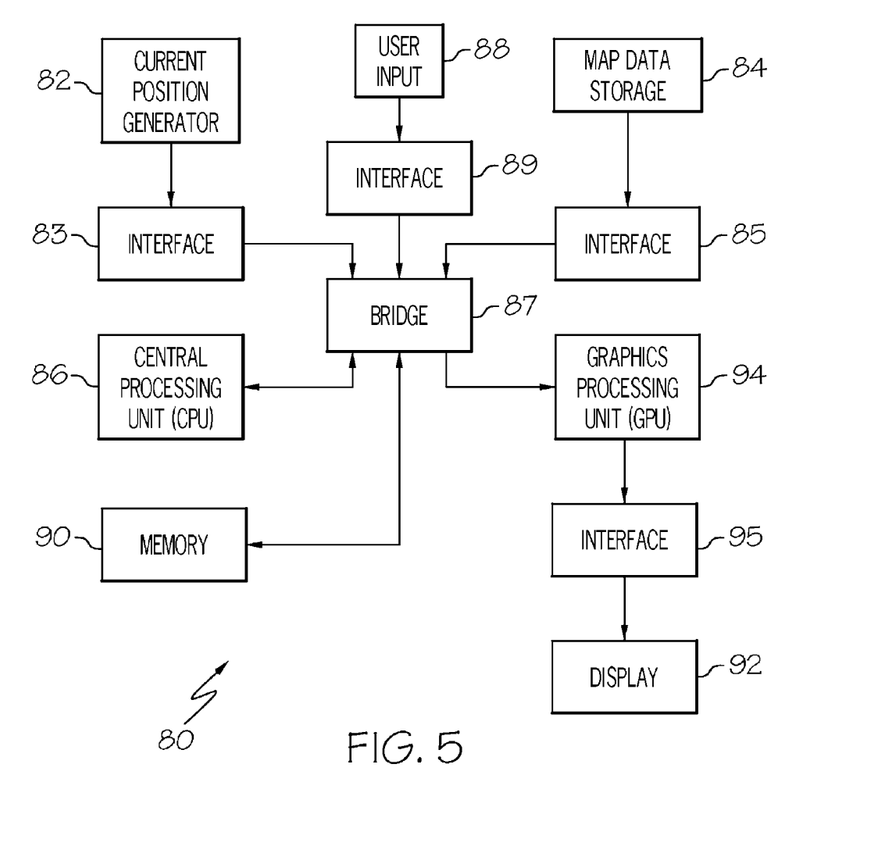
FIG. 5 is a simplified schematic diagram of an electronic system adapted to provide an AEP navigation display, according to a further embodiment of the present invention and showing further detail.

FIG. 5 shows a simplified schematic diagram of electronic system 80 adapted to provide an AEP for a navigation display, according to a further embodiment of the present invention and showing further detail. System 80 comprises current position generator 82 with interface unit 83, map data source 84 with interface unit 85, central processing unit (CPU) 86 with bridging unit 87, user input 88 with interface 89, memory 90, and display 92 with associated graphics processing unit (GPU) 94 and interface unit 95. Interface units 83, 85, and 89 are coupled to bridge 87 which is in turn coupled to CPU 86, memory 90 and GPU 94. Bridge 87 facilitates communication among elements 82, 84, 86, 90, 94 and their associated interface units. Elements 82, 84, 88 with their associated interface units are analogous to elements 62, 64, 68 of FIG. 5. Interface units 83, 85, 89, 95 provide level shifting, serial to parallel data transformations, data format conversions and housekeeping functions to facilitate data flow along the indicated paths. As previously noted for current position source 62, current position source 82 may be any type of sub-system adapted to provide current ($\phi_1, \lambda_0$) as desired. As with map data source 64 of FIG. 5, map data source 84 contains the source map files of any geo-spatially oriented data set, stored in any convenient manner, as for example and not intended to be limiting, on a server hard drive, or on ram disk, or on flash memory, and/or on other magnetic and/or optical data storage medium. The present invention does not depend upon the manner in which map data 64, 84 is stored. Bridge 87 provides communication channels between CPU 86, GPU 94, map data source 84, memory 90, user interface 88, and current position generator 82 as needed. CPU 86 executes the source program and processing information stored in memory 90 to: (1) read the current ($\phi_1, \lambda_0$) information from current position generator 82 through interface 83 and bridge 87, (2) read the desired range R (and other relevant information) from user input 88 through interface 89 and bridge 87, (3) read the appropriate data set for ($\phi_1, \lambda_0$) and R from map data source 84 through interface 85 and bridge 87, (4) process the source data 40 of FIG. 2 for ($\phi_1, \lambda_0$) and R into a texture map such as database 50 of FIG. 3, (5) generate a set of vertices representing concentric circles of data points to which texture map 50 will be mapped onto display 58, 92, (6) generate texture spatial coordinates based on the AEP centered about the current ($\phi_1, \lambda_0$) and within range R and assigns these coordinates to each of the vertices generated in step (5) above, and (7) send the texture, vertex coordinates and texture coordinates to GPU 94 for final processing and presentation on display 92 in the form indicated on display 58 of FIG. 3. Vertex coordinate, texture coordinate, etc., are further explained below.

The conversion of the spatial coordinates of texture data 50 to AEP data 52 is accomplished using the following equations. In this case, we assume that texture data 50 is in the form of an ECP although this is not a requirement. The production of the final display which presents the map data in an AEP format is conveniently accomplished via a two stage process. The first stage is a series of reverse transformations that convert screen coordinates on the display 58 to ECP coordinates 40 which are used to index the map data. The process begins by choosing a point on display 58 that will serve as center 42 of the AEP projection and a desired radius R that will be used as the maximum extent of the AEP projection. R is then subdivided into a number of concentric circles at regular spacing, e.g., circles 43, 45 and 47. Note that at this stage, we assume that flat, two dimensional display 58 is already an AEP projection 52. The goal is to find what texture data 50 and by extension, map data 40 should occupy each point in AEP data 52 on the display 58. Each point (e.g., 521, 522, 523 and 524) along each circle (e.g., 43, 45, 47) is then converted to an $(y_i, x_i)_{AEP}$ coordinate, relative to the center of projection 42 and using proper units. The AEP coordinate is then converted to a geo-referenced coordinate ($\phi_i, \lambda_i$) 401, 402, 403 and 404 (e.g., see FIG. 2) using the following equations as defined by John P. Snyder in "Map Projections—A Working Manual;" U.S. Geological Survey Professional Paper 1395; Washington 1987. Note that r is the radius of sphere 24 (see FIG. 1), $(\phi_1,\lambda_0)$ is center 42 of projection 52 in geo-spatial coordinates and $(y_i,x_i)$ is the relative distance from center 42 of projection 52 as viewed from two-dimensional AEP 52.

$$\rho=(x_i^2+y_i^2)^{1/2}$$

$$c=\rho/r$$

If $\rho\neq 0$:

$$\Phi_i=\arcsin[\cosine\ c\ \sine\ \Phi_1+(y_i\ \sine\ c\ \cosine\ \Phi_1/\rho)]$$

$$\lambda_i=\lambda_0+\arctangent[x_i\ \sine\ c/(\rho\ \cosine\ \Phi_1\ \cosine\ c-y_i\ \sine\ \Phi_1\ \sine\ c)],\Phi_1\neq\pm 90°$$

$$\lambda_i=\lambda_0+\arctangent[x_i/(-y_i)],\Phi_1=90°$$

$$\lambda_i=\lambda_0+\arctangent[x_i/y_i],\Phi_1=-90°$$

If $\rho=0$:

$$\Phi_i=\Phi_1$$

$$\lambda_i=\lambda_0$$

Note that care must be taken in the above equations to place the result of the arctangent operations in the proper quadrant. Now that the geo-referenced coordinates 401, 402, 403 and 404 have been discovered, the map data 40 may be indexed to choose the proper $(y_i,x_i)_{ECP}$ coordinates 501, 502, 503 and 504 in texture data 50 that will be mapped to the screen coordinate 521, 522, 523 and 524 in AEP 52 and display 58. A forward transformation now occurs that assigns the texture data 50 at $(y_i,x_i)_{ECP}$ coordinates to $(y_i,x_i)_{AEP}$ screen coordinates on the display 58. This is performed via the graphics processing unit (see FIG. 5) and is conveniently accomplished using a standard graphics pipeline.

A standard graphics pipeline generally begins with a three-dimensional object space in which vertices are plotted. The object space may have any numeric range desired but is eventually normalized along each axis (x,y,z). Vertices may be combined as desired to generate lines, points, triangles, quads or polygons. There are many variants to vertex combination, usually in the area of performance improvement. Of particular interest is the triangle strip where, once three vertices have been plotted, each subsequent vertex produces a triangle. This is accomplished by implicitly using the previous two vertices to complete the shape. Obviously, this is much more efficient than generating three vertices per triangle. The next stage in the graphics pipeline is the Modelview transformation, which converts object coordinates into eye coordinates. The Modelview transformation is simply a matrix by which the object coordinate vertices are multiplied. The Modelview matrix represents any combination of translation, scale, and rotation operations, each of which may be applied to any or all of the three axes. The eye coordinates are then processed through the Projection transformation using the Projection matrix to produce clip coordinates. The Projection matrix simply defines a bounding box for vertices. Those vertices that fall outside of the bounding box are not passed on to the next stage of the pipeline. This stage also normalizes the vertices onto the range as described above and can be thought of as placing a camera to capture the image created by the vertices. Next, the clip coordinates are converted to normalized device coordinates via perspective division. If a perspective projection is being utilized, this step makes objects closer to the camera appear larger and objects further from the camera appear smaller. If an orthographic projection is being utilized, this step has no effect. Orthographic projections are typical for two-dimensional map applications. Finally, the normalized device coordinates are converted to window coordinates using the viewport transformation. This step maps the coordinates that were normalized to the given range to actual pixels on the display.

One other aspect of a typical graphics pipeline germane to the current invention is texture mapping. Implicit in the previous discussion is the task of color assignment. In general, any vertex may be assigned any color. One may choose that the color for one of the vertices becomes the color for an entire triangle, or one may choose that the final triangle color is the interpolation (or gradient) of all vertex colors that contribute to that particular triangle. Extending this concept, texture mapping allows a user to generate a set of colors in memory and arbitrarily map these colors to individual vertices through the use of texture coordinates. Each texture coordinate must be assigned to a vertex. The typical digital map application generates a texture map in memory that represents the inherent map data projection as a two-dimensional bitmap. As needed, texture coordinates are mapped to vertices and sent down the graphics pipeline to obtain the final display with the desired projection.

The method described above may be applied to any projection and map data source. That is, the final display projection may be any projection that one may desire and the source map data may be any geo-referenced data. An important aspect is transforming the on screen coordinates to proper geo-referenced coordinates, properly indexing the map data from these coordinates, and accurately transforming these coordinates back onto the display in order to obtain the desired projection.

Figure 6:
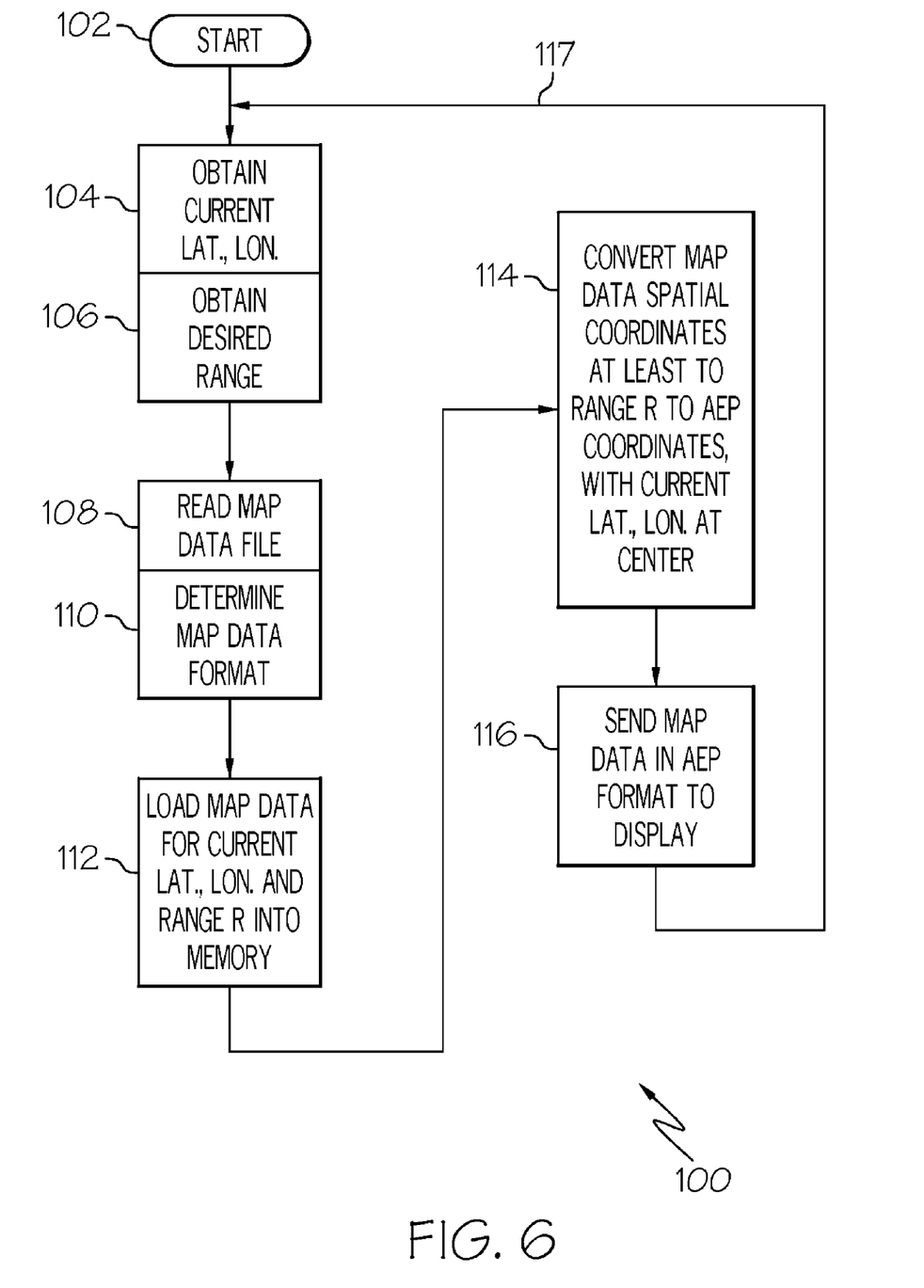
FIG. 6 is a simplified flow chart of a method of providing an AEP navigational display according to still further embodiments of the present invention.

FIG. 6 is a simplified flow chart of method 100 of providing an AEP map for a navigational display according to still further embodiments of the present invention. Method 100 begins with START 102 which may occur when the various avionics systems of the aircraft are turned on. In initial steps 104, 106 the current aircraft location $(\phi_1,\lambda_0)$ is obtained, e.g., from generator 62, 82, and the current range R is obtained, e.g., from user input 68, 88, respectively. Steps 104, 106 may be executed in either order. In step 108 map data source 64, 84 is read and in step 110, the format of the map data provided by map data source 64, 84 is determined. Steps 108 and 110 may be performed in either order. If the data being used by system 60, 80 always has the same format, then step 110 may be omitted and the appropriate transformation fixed in the software or hardware. If the map data formats may vary, then step 114 will include a sub-routine (not shown) for looking up the appropriate transformation algorithms needed for the particular data format determined in step 110 in order to convert the spatial coordinates of the map data into the AEP reference frame. In step 112, the appropriate data from data source 64, 84 for the current $(\phi_1,\lambda_0)$ and R is loaded into memory 70, 90 so as to be available for manipulation by controller 66 and/or CPU 86 as required by step 114. In step 114, the map data obtained in step 112 is manipulated as illustrated graphically in FIGS. 2-3 to convert the spatial coordinates, at least our to range R, into the AEP reference frame, with the current $(\phi_1, \lambda_0)$ placed at the center of rotation of the display. Note that the center of rotation is not necessarily the physical center of the actual display screen but may be, for example, located near the bottom edge of the actual display screen so as to enhance the forward visibility. In step 116 the map data with the topographical texture feature information is sent to display 72 or via GPU 94 and interface 95 to display 92. The use of GPU 94 and interface 95 facilitates rapid refresh of display 92 by off-loading from CPU 86 the necessary functions of processing the AEP map database 52 of FIG. 3 into a form suitable for the display itself.

Figure 7:
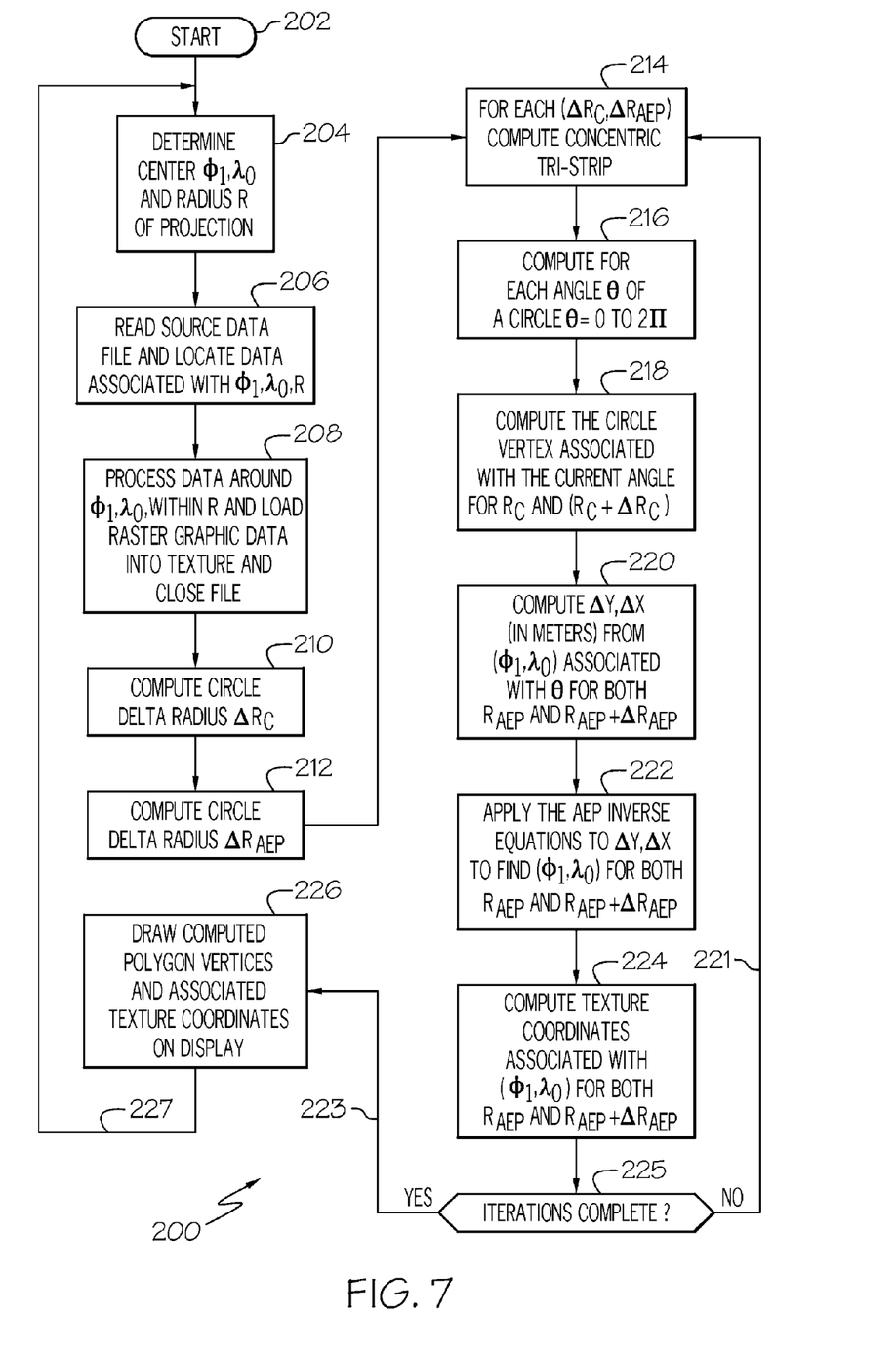
FIG. 7 is a simplified flow chart of a method of providing an AEP navigational display according to yet further embodiments of the present invention and showing further detail.
Figure 8:
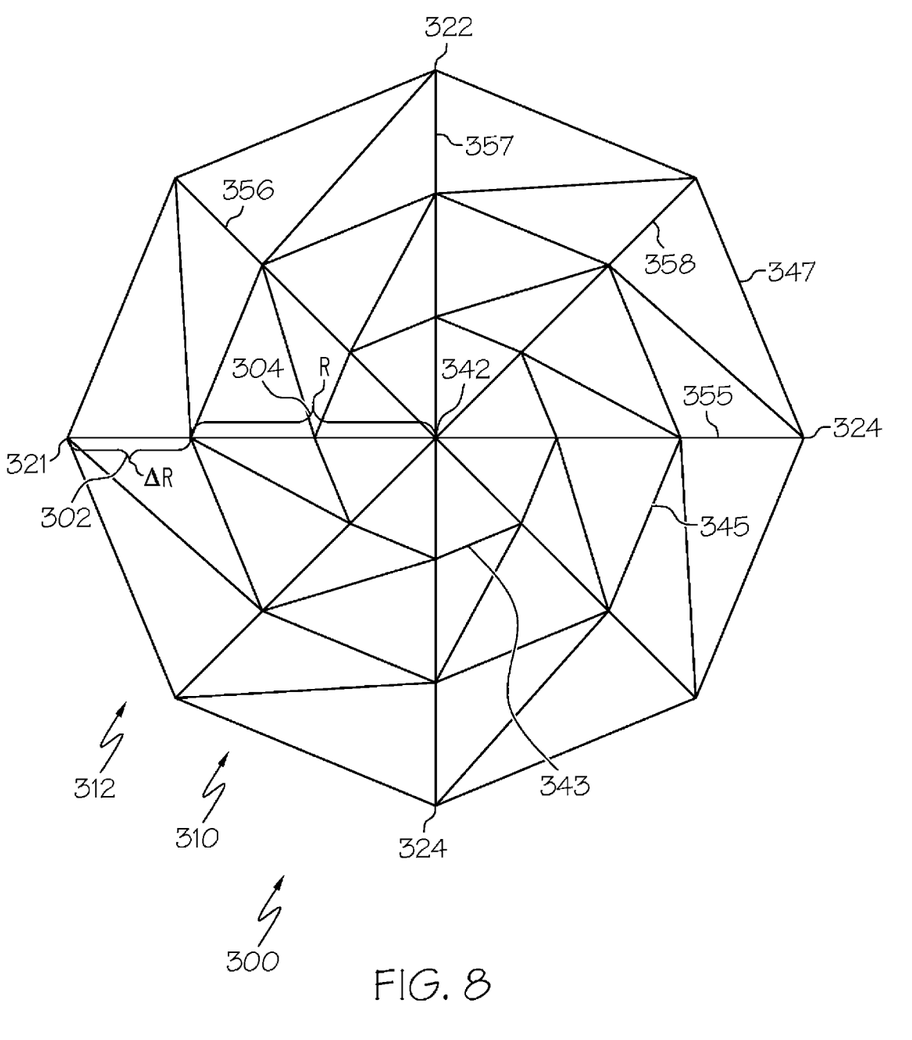
FIG. 8. shows a representation of concentric triangle strips to which texture data is mapped to provide an AEP navigational display according to yet further embodiments of the present invention and showing further detail.

FIG. 7 is a simplified flow chart of method 200 of providing AEP data for navigational display 58, 72, 92 according to yet further embodiments of the present invention and showing further detail. FIG. 8 shows more detailed representation (e.g., projection) 300 of the approximations to the various concentric circles (represented as concentric polygons 343, 345, 347, etc.), and object coordinates 321, 322, 323, 324 analogous to contours 42, 43, 45, 47 and object coordinates 521, 522, 523, 524 of FIG. 3 that are used in method 200. In FIG. 8 concentric triangle strips (also referred to as tri-strips or tri-strip polygons) 347, 345, 343, ... etc., are used to map (e.g., ECP) texture data 50 to AEP object coordinates 52. While only three concentric tri-strips 343, 345, 347 and four radials 355, 356, 357, 358 are shown in FIG. 8, this is merely for convenience of illustration and not intended to be limiting. Persons of skill in the art will understand that any number of concentric tri-strips (e.g., 343, 345, 347, ... etc.), and radials (e.g., 355, 356, 357, 358 ... etc.) can be used, limited generally only by the available computational capacity. For convenience, concentric tri-strips 343, 345, 347, ... etc., however many there are, are referred to collectively as tri-strips 310. For convenience, radials 355, 356, 357, 358, ... etc., however many there are, are referred to collectively as radials 312. FIGS. 7 and 8 should be considered together.

Method 200 of FIG. 7 begins with START 202 that can occur, for example, when the various avionics systems of the aircraft are turned on or whenever display 58 is refreshed because of a change in the center of projection, e.g., the aircraft's current position. Initial step 204 obtains the $(\phi_1, \lambda_0)$ of the current aircraft position that will be used as the center of projection and maximum radius R desired for the AEP display. Step 206 obtains map data 40 from map data source 64, 84 and processes the source map data into geo-referenced topographic color data which is then loaded into texture data 50 in memory 70, 90 in step 208. Step 210 computes a constant delta radius value $\Delta R_c$ 302 (see FIG. 8) that splits radius $R_c$ 304 into a series of equally spaced concentric circles or tri-strips 310 with center 342. Stated another way, $\Delta R_c$ is the desired radius of the largest polygon divided by the number of concentric tri-strips 310, to be drawn. $R_c$ 304 and $\Delta R_c$ 302 have their units defined in terms of object coordinates. For the purposes of this discussion, the units may be in terms of pixels on the display 58. Step 212 computes a constant delta radius value $\Delta R_{AEP}$ which splits radius $R_{AEP}$ 304 into a series of equally spaced concentric circles or tri-strips 310 with center 342. Stated another way, $\Delta R_{AEP}$ is the desired radius $R_{AEP}$ of the projection (e.g., in meters) divided by the number of concentric tri-strips 310 to be drawn. $R_{AEP}$ 304 and $\Delta R_{AEP}$ 302 have their units defined in terms of radius r of the earth sphere and is typically defined in units of meters. Step 214 initiates sub-routine loop 214-225 wherein for each $\Delta R_c$ and $\Delta R_{AEP}$ one of concentric tri-strips 310 is computed. Sub-routine step 216 initiates a loop of functionality that iterates through all angles $\theta$ of the circle, where $\theta$ ranges from 0 to $2\pi$. The incremental variable AO can be thought of as the angular separation between radials 312. Sub-routine step 218 computes the object coordinate vertex associated with $R_c$ 304 and $R_c + \Delta R_c$ 343, 345, 347, etc. As an example of how these calculations are made based on projection 300 of FIG. 8, there are always two coordinates, say R and $\Delta R$. Additionally, we have a constant $\Delta R_c$ (or $\Delta R_{AEP}$). Initially, R is set to 0 and $\Delta R$ equals $\Delta R_c$ (or $\Delta R_{AEP}$). In the next iteration, R now equals the previous $\Delta R$ and the new $\Delta R$ now really equals the previous $\Delta R$ plus the constant delta, $\Delta R_c$. That is, we are incrementally traversing radially outward from center 342 of tri-strip representation 300. Note that, depending on the iteration that step 214 is executing, sub-routine step 218 may compute any of tri-strips 310, respectively. Sub-routine step 220 computes the $\Delta y$ and $\Delta x$ values, e.g., in meters, from the center 342 of projection 300 at the current angle $\theta$. This is accomplished for both $R_{AEP}$ 304 and $R_{AEP} + \Delta R_{AEP}$ 343, 345, 347, etc., collectively 310. Again, note that depending on the iteration that step 214 is executing, sub-routine step 220 may compute $R_{AEP}$ and $R_{AEP} + \Delta R_{AEP}$ for any of tri-strips 310. Sub-routine step 222 applies the inverse AEP equations as previously defined to obtain geo-referenced coordinates $(\Phi, \lambda)$ for each $(\Delta y, \Delta x)$ computed in sub-routine step 220. These coordinates are then used in sub-routine step 224 to compute texture index values that will reference the appropriate topographic information contained in texture data 50. After sub-routine step 224, query 225 tests to determine whether all iterations have been completed, that is, whether all tri-strips 310 have been computed for both the object coordinates that comprise the concentric circles approximated by tri-strips 310 and the texture indices that map the texture data 50 to those object coordinates. If the outcome of sub-routine query 245 is NO, then as shown by path 221, method 200 returns to sub-routine step 214 and sub-routine loop 214-225 is repeated. If the outcome of query 225 is YES indicating that all iterations have been completed, then as shown by path 223 method 200 proceeds to step 226. In step 226, all object coordinates and texture coordinates that have been computed are sent down graphics pipeline 94, 95 to obtain the final AEP data for presentation on display 58, 72, 92. Method 200 then returns to START 202 as shown by path 227 and method 200 is repeated to update display 58, 72, 92 for any intervening aircraft location changes.

The foregoing description of the invention has, for convenience of explanation, referred to an aircraft as the vehicle carrying the invented system and method. However, those of skill in the art will understand based on the teachings herein that the invented system and method apply to any moving vehicle whether or not it moves through the air or on or under the sea or on land. Accordingly, as used herein and in the claims that follow, the term "aircraft" is intended to include such other types of moveable vehicles. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for providing an aircraft navigation display, comprising:
   in either order,
   obtaining current latitude and longitude $\Phi_1, \lambda_0$ of the aircraft, and
   obtaining the desired range R to be covered by the navigation display at least in the forward direction of the aircraft; then
   reading electronic map data for an area of approximate radius R around $(\phi_1, \lambda_0)$ in at least the forward direction of the aircraft, wherein the map data file includes topographical features associated with each electronic map data spatial coordinate;

converting the electronic map data spatial coordinates to spatial coordinates of an azimuthal equidistant projection (AEP) so that the topographical features are now associated with said AEP spatial coordinates; and sending the converted map data and associated topographical features in AEP spatial coordinates to a display to be presented in AEP relationship to $\Phi_1,\lambda_0$.

2. The method of claim 1, where in the converting step comprises, performing the converting step on concentric tri-strips of the electronic map data centered on $\Phi_1,\lambda_0$.

3. The method of claim 1, wherein the electronic map data file comprises an equidistant cylindrical projection.

4. The method of claim 1, wherein the step of reading the electronic map data comprises determining the electronic map data format.

5. The method of claim 1, wherein the converting step utilizes computing a circle delta radius $\Delta R_c$.

6. The method of claim 5, wherein the converting step comprises computing a circle delta radius $\Delta R_{AEP}$.

7. The method of claim 5, wherein the converting step utilizes concentric tri-strips for each $R_c + \Delta R_c$.

8. The method of claim 6, wherein the converting step utilizes concentric tri-strips for each $R_{AEP} + \Delta R_{AEP}$.

9. An apparatus for providing an aircraft navigation display, comprising
a generator for providing the aircraft's current latitude and longitude ($\phi_1,\lambda_0$);
a user input for providing the desired map range R;
a display for presenting map information to a user including the aircraft's current latitude and longitude ($\phi_1,\lambda_0$) with respect to the map information;
a map data source for providing topographical information associated with geo-spatial coordinates around ($\phi_1,\lambda_0$) at least in the forward direction of the aircraft; and
a controller and memory coupled to the generator, map data source, user input and display, wherein the controller and memory are adapted to transform the map data in the vicinity of ($\phi_1,\lambda_0$) for presentation on the display in azimuthal equidistant projection format so that perceived ranges and directions from ($\phi_1,\lambda_0$) to various map features identified thereon are drawn substantially to the same scale independent of where such features appear on the display.

10. The apparatus of claim 9, wherein the controller comprises a central processing unit (CPU).

11. The apparatus of claim 10, wherein the controller also comprises a graphics processing unit (GPU).

12. The apparatus of claim 10, wherein an interface unit is serially coupled between the display and the GPU.

13. The apparatus of claim 12, wherein a communications bridge is serially coupled between the CPU and the GPU.

14. The apparatus of claim 9 wherein the memory comprises both volatile and non-volatile memory.

15. A method for providing azimuthal equidistant projection (AEP) navigational information on a display in a moving aircraft, comprising:
determining the current latitude and longitude of the moving aircraft;
retrieving stored map information from local memory on the moving aircraft, in the vicinity of the current latitude and longitude;
if not already known, determining a transformation required to convert spatial coordinates of the stored map information to AEP spatial coordinates on the display;
converting the spatial coordinates of the stored map information to AEP spatial coordinates so that topological information associated with the spatial coordinates of the map information is now associated with the AEP spatial coordinates; and
sending the converted spatial coordinates and associated topological information to the display to be presented in AEP format.

16. The method of claim 15, further comprising:
determining if the current latitude and longitude of the moving aircraft has changed, and if so;
repeating the retrieving, converting and sending steps so as to provide updated AEP navigational information on the display.

17. The method of claim 15, further comprising:
determining the aircraft heading; and
limiting conversion of the spatial coordinates substantially to spatial coordinates located forward of a line perpendicular to the aircraft heading and passing through the current latitude and longitude.

18. The method of claim 15, wherein the retrieval and converting steps include spatial coordinates and topological information at least within a predetermined range R from the current latitude and longitude.

19. The method of claim 18, wherein the retrieval and converting steps primarily focus on spatial coordinates lying substantially in a half circle in the direction of travel of the aircraft from the current latitude and longitude.

20. The method of claim 19, wherein the half circle has a radius R where R is a desired display range setting provided by a user.

* * * * *